US010727545B1

United States Patent
Gan et al.

(10) Patent No.: US 10,727,545 B1
(45) Date of Patent: Jul. 28, 2020

(54) METHODS OF CHARGING SECONDARY LITHIUM METAL BATTERIES TO REACTIVE DEAD LITHIUM WITH REDOX SHUTTLING ADDITIVES AND BATTERY CONTROL SYSTEMS INCORPORATING THE SAME

(71) Applicant: SES Holdings Pte. Ltd., Singapore (SG)

(72) Inventors: Hong Gan, Miller Place, NY (US); Mackenzie King, Essex, MA (US); Qichao Hu, Arlington, MA (US)

(73) Assignee: SES Holdings Pte. Ltd., Singapore (SG)

( * ) Notice: Subject to any disclaimer, the term of this patent is extended or adjusted under 35 U.S.C. 154(b) by 0 days.

(21) Appl. No.: 16/530,788

(22) Filed: Aug. 2, 2019

Related U.S. Application Data

(60) Provisional application No. 62/832,974, filed on Apr. 12, 2019.

(51) Int. Cl.
| | |
|---|---|
| *H01M 10/44* | (2006.01) |
| *H02J 7/00* | (2006.01) |
| *H01M 10/42* | (2006.01) |
| *H01M 10/052* | (2010.01) |

(52) U.S. Cl.
CPC ......... *H01M 10/44* (2013.01); *H01M 10/052* (2013.01); *H01M 10/4235* (2013.01); *H02J 7/0013* (2013.01)

(58) Field of Classification Search
CPC .................................................. H01M 10/44

USPC ........................................................ 320/137
See application file for complete search history.

(56) References Cited

U.S. PATENT DOCUMENTS

| | | | |
|---|---|---|---|
| 8,367,253 B2 | 2/2013 | Chen et al. | |
| 2009/0286162 A1* | 11/2009 | Lamanna et al. | ....... H01M 6/04 |
| | | | 429/307 |
| 2010/0129724 A1 | 5/2010 | Kolosnitsyn | |
| 2018/0095141 A1* | 4/2018 | Wild et al. | ......... G01R 31/3679 |

FOREIGN PATENT DOCUMENTS

WO     2017214276 A1    12/2017

OTHER PUBLICATIONS

Zhang, Lu; Redox shuttle additives towards safer lithium-ion batteries; Joint Center for Energy Storage Research; International Battery Seminar & Exhibit, Fort Lauderdale, FL; Mar. 21, 2017.

(Continued)

*Primary Examiner* — Edward Tso
*Assistant Examiner* — Ahmed H Omar
(74) *Attorney, Agent, or Firm* — Downs Rachlin Martin PLLC

(57) ABSTRACT

Aspects of the present disclosure include methods of charging secondary lithium metal batteries that include selectively and intentionally overcharging the battery to activate redox shuttling additives in order to reactivate dead lithium. Aspects of the present disclosure also include control systems for determining when to initiate a lithium reactivation charging process and for determining one or more parameters of a lithium reactivation charging protocol.

26 Claims, 8 Drawing Sheets

(56) References Cited

OTHER PUBLICATIONS

Taggougui, M. et al.; 2,5-Difluoro-1,4-dimethoxybenzene for overcharge protection of secondary lithium batteries; Journal of Power Sources 174 (2007) 1069-1073, Science Direct.
Moshurchak, L. M., et al.; High-potential redox shuttle for use in lithium-ion batteries; Journal of the Electrochemical Society, 156 (4) A309-A312 (2009).
Lee, Doo-Yeon et al.; Redox shuttle additives for chemical overcharge protection in lithium ion batteries; Korean J. Chem. Eng. 19(4), 645-652 (2002).
Lamanna, W.M., et al.; Chemical redox shuttle—design for high voltage; 3M 2008; 3M Redox Shuttles; pp. 1-28.
Fang, Chengcheng et al.; Quantifying inactive lithium in lithium metal batteries; (no date).
Zhang, Lu; Redox shuttle additives towards safer lithium-ion batteries; Joint Center for Energy Storage Research; International Battery Seminar & Exhibit, Fort Lauderdale, FL; Mar. 23, 2017.
Huang, Jinhua et al.; An organophosphine oxide redox shuttle additive that delivers long-term overcharge protection for 4 V lithium-ion batteries; Journal of Materials Chemistry A; J. Mater. Chem. A, 2015, 3, 10710-10714 (2015).
Leonet, Olatz et al.; Improving the safety of lithium-ion battery via a redox shuttle additive 2,5-Ditert-butyl-1, 4-bis(2-methoxyethoxy)benzene (DBBB); ACS Appl. Mater. Interfaces 2018, 10, 9216-9219.
Patterson, Mary L.; Chemical Shuttle Additives in Lithium Ion Batteries; Final Technical Report; Jun. 2014; DE-EE0001938, U.S. Department of Energy; National Energy Technology Laboratory.

\* cited by examiner

METHODS OF CHARGING SECONDARY LITHIUM METAL BATTERIES TO REACTIVE DEAD LITHIUM WITH REDOX SHUTTLING ADDITIVES AND BATTERY CONTROL SYSTEMS INCORPORATING THE SAME

RELATED APPLICATION DATA

This application claims the benefit of priority of U.S. Provisional Patent Application Ser. No. 62/832,974, filed Apr. 12, 2019, and titled, "Method of Using Electrolyte Redox Shuttling Additives to Reactivate the Dead Lithium in Rechargeable Lithium Metal Anode Batteries," which is incorporated by reference herein in its entirety.

FIELD OF THE INVENTION

The present invention generally relates to the field of battery control systems for secondary lithium metal batteries. In particular, the present invention is directed to methods of charging secondary lithium metal batteries to reactivate electrically isolated dead lithium and battery control systems for performing the same.

BACKGROUND

Secondary (also referred to as rechargeable) lithium metal batteries provide great promise for the next generation of energy storage devices due to the significantly higher energy density they provide. Unlike conventional lithium ion batteries, which contain anodes (also referred to as negative electrodes) formed from an intercalant material, such as graphite, lithium metal battery anodes are formed from lithium metal, for example, thin sheets of lithium metal coupled to current collectors. The intercalation anodes of lithium ion batteries only provide host structures for lithium ions and do not contribute to energy storage. Lithium metal battery anodes, by contrast, are formed, in part, by lithium metal, which contributes to energy storage, thereby significantly increasing volumetric and gravimetric energy density.

During charging and discharging cycles of a lithium metal battery, lithium metal is deposited onto the anode during charge and stripped from the anode during discharge. The morphology of the lithium on the surface of the anode varies throughout the life of the battery and is affected by a variety of variables. Spiky dendritic crystals of lithium metal, also referred to as dendrites, often form on the surface of a lithium metal anode. Also, a solid-electrolyte interphase (SEI) layer can form on the surface of the anode. As the number of charge-discharge cycles increases, an increasing amount of lithium can become "dead lithium" by becoming electrically isolated from the current collector of the anode, thereby making the isolated or dead lithium unavailable for further discharge of energy and reducing the coulombic efficiency of the cell. One form of dead lithium is dendritic crystals of lithium physically and/or electrically isolated from the electric conduction pathway to the current collection by in-situ formed SEI layers.

SUMMARY OF THE DISCLOSURE

In one implementation, the present disclosure is directed to a method of charging a lithium metal battery having a normal operation charging voltage upper limit ($V_{UL}$), a redox shuttling additive having an oxidation potential that is greater than $V_{UL}$, and a lithium metal anode having a current collector and dead lithium that is electrically isolated from the current collector. The method includes charging the lithium metal battery at a lithium reactivation charging voltage, the lithium reactivation charging voltage being greater than $V_{UL}$; oxidizing the redox shuttling additive to form a redox shuttling additive cation-radical; reacting the cation-radical with the dead lithium to form a neutral redox shuttling additive and a lithium ion; and redepositing the lithium ion on the anode.

In another implementation, the present disclosure is directed to a method of charging a lithium metal battery having a cathode and a redox shuttling additive. The method includes determining a likelihood of dead lithium on an anode of the lithium metal battery, and initiating a lithium reactivation charging process in response to the determined likelihood being greater than a threshold value; wherein the lithium reactivation charging process includes charging the battery with a lithium reactivation charging current, the lithium reactivation charging current designed and configured to increase a potential of the cathode above a normal operation charging voltage upper limit ($V_{UL}$) to oxidize the redox shuttling additive and reactivate the dead lithium with the oxidized redox shuttling additive.

In yet another implementation, the present disclosure is directed to a method of charging a lithium metal battery having a lithium metal anode, a redox shuttling additive and dead lithium on the anode. The method includes intentionally overcharging the battery to activate the redox shuttling additive and form shuttling additive cation radicals for chemically reacting with the dead lithium to release lithium ions from the dead lithium.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present disclosure include battery management control systems and battery chargers for controlling and charging secondary lithium metal batteries that are configured to safely increase a charging voltage above a normal operation charging voltage to reactivate dead lithium that has become electrically isolated from a current collector of the battery. Batteries of the present disclosure include redox shuttling additives configured with an electric potential greater than a normal operation charging voltage upper limit that are configured to react with dead lithium to reactivate the dead lithium.

Figure 1:
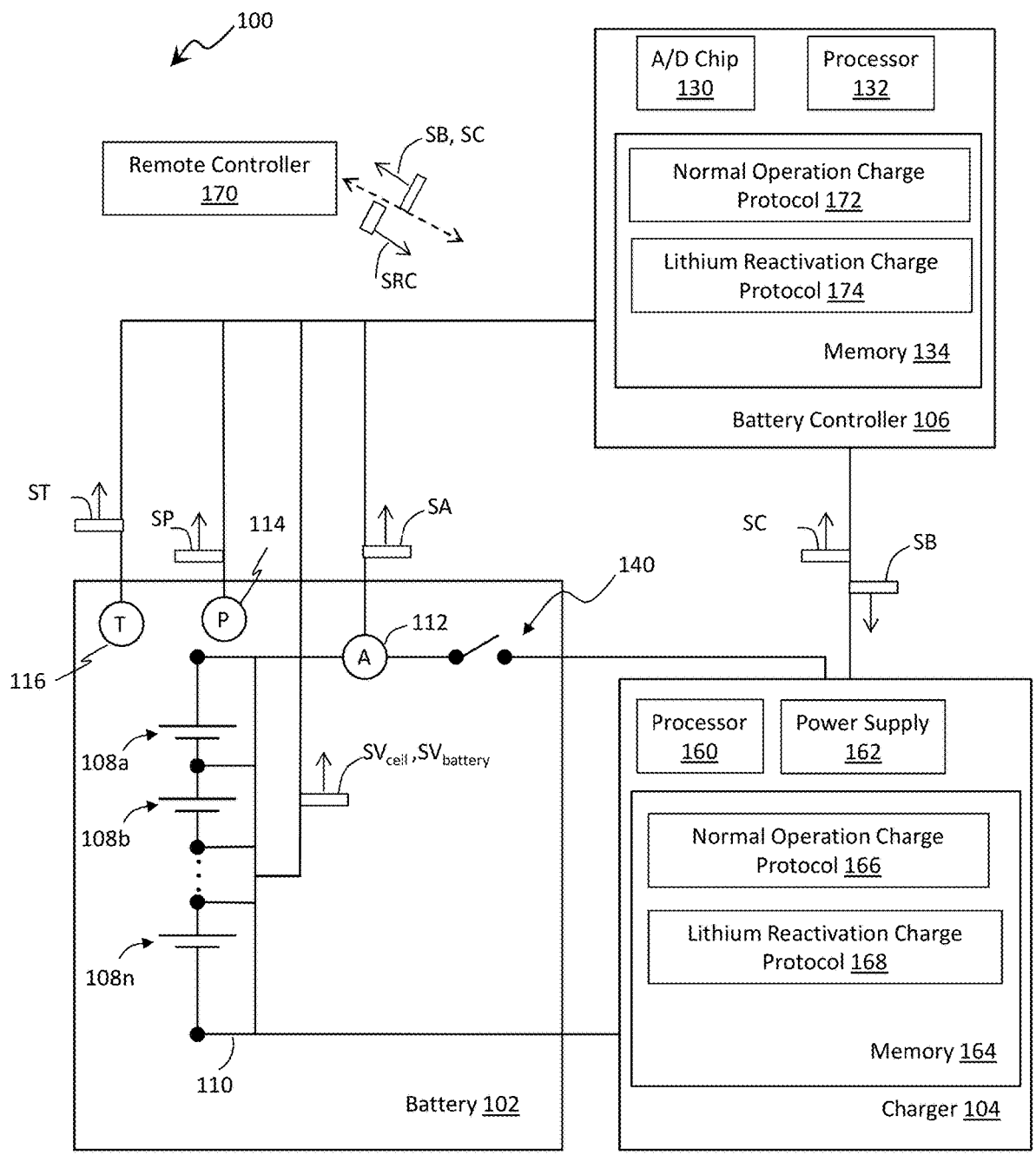
FIG. 1 is a schematic diagram of an example lithium metal battery and charger, according to the present disclosure.

FIG. 1 is a schematic illustration of an example system 100 made in accordance with the present disclosure that includes a lithium metal battery 102 operably connected to a battery charger 104 for charging the battery and a battery controller 106 for controlling the battery. As described more below, one or both of battery controller 106 and charger 104 may be configured to periodically execute a lithium reactivation charge protocol to intentionally increase a charging voltage above a normal operation charging voltage upper limit ($V_{UL}$) to thereby activate a redox shuttling additive to reactivate dead lithium to increase cell cycle life and coulombic efficiency.

In the illustrated example, battery 102 includes a plurality of electrochemical cells 108a, 108b, ... 108n that may be connected in series or parallel for generating electrical energy. A voltage can be imposed across the positive and negative electrodes of cells 108 by creating a circuit 110, or electrical connection, between the electrodes. Battery controller 106 may also be operably and/or communicatively coupled to the cell electrodes and configured to receive individual cell voltage signals $SV_{cell}$ and a battery voltage signal $SV_{battery}$ for monitoring the voltage across each cell 108 and the total voltage generated by the battery 102. Battery 102 also includes a current sensor 112 configured to generate a current signal, SA, a pressure sensor 114 configured to generate a pressure signal SP, and a temperature sensor 116 configured to generate a temperature signal ST. Battery controller 106 is communicatively coupled to each of current, pressure, and temperature sensors 112, 114, and 116 for receiving the generated signals SA, SP, and ST for monitoring a state of battery 102 in realtime. Pressure sensor 114 may include one or more sensors located throughout battery 102 for directly or indirectly monitoring the pressure generated within battery 102 during use, for example, pressure generated by lithium plating on the anode and/or cathode of the cells 108 and/or the pressure generated by any gases generated in the cells during charge or discharge. In one example, pressure sensor 114 includes one or more strain gauges located, for example, between adjacent cells 108 and/or between a cell and an adjacent packaging or housing for monitoring a force generated by the cell due to an expansion of the cell due to lithium plating or generated gases. Temperature sensor 116 may include one or more of any type of temperature sensor known in the art, such as one or more thermocouples and/or thermistors.

Battery controller 106 may include an analog-to-digital converter (A/D) chip 130 for converting analog signals, such as one or more of current, pressure, and temperature signals SA, SP, and/or ST to a digital signal, one or more processors and/or microcontrollers 132, and a memory 134. Battery 102 or battery controller 106 may also include a variety of other features and components known in the art, but not illustrated, such as a voltage converter and regulator circuit to maintain safe levels of voltage and current; an electrical connector that lets power and information flow in and out of the battery, etc. Processor 132 may be configured with instructions for providing a battery state of charge, for estimating a present state of charge of the battery and to store data in memory 134 related to battery parameters and also transmit battery parameters to other processors.

Processor 132 may be configured with instructions for monitoring overcharge (overvoltage), overdischarge (undervoltage) and excessive charge and discharge currents (overcurrent, short circuit). Processor 132 can also be configured with instructions to protect battery 102 from harmful over or under charging or overcurrent conditions, for example, by controlling a switch 140 (e.g., a MOSFET or other control device) to limit energy transfer or fully disconnect battery 102 from a load or charger 104.

In some examples, processor 132 may be configured to monitor voltage signals $V_{cell}$, $V_{battery}$ during charging and discharging to determine if any individual cell 108 is in a potentially damaging state. For example, during charging, an individual cell 108 may reach or exceed a normal operation charging voltage upper limit ($V_{UL}$) even though the overall battery voltage $V_{battery}$ is still below a corresponding upper limit. Similarly, during discharge, the voltage of an individual cell 108 may drop below a lower voltage limit ($V_{LL}$) even though the voltage of the overall battery voltage is still above a corresponding lower limit. In such events, processor 132 can discontinue charging or discharging battery 102 or an individual cell 108 when the processor detects an individual cell voltage at an undesired value. In some examples, processor 132 can also evaluate the relative voltage levels of adjacent cells 108 and redistribute charge between the adjacent cells to mitigate differences in the cell voltages.

Battery controller 106 may also be communicatively coupled to charger 104 for charging battery 102. Battery controller 106 may provide a battery signal, SB to charger 104, which may include any of a variety of historical and/or realtime battery parameter information, such as realtime values of battery voltage, current, temperature, pressure, SOC, and/or depth of discharge (DOD). In some examples, battery controller 106 may also be configured to execute a charging protocol and provide charging instructions to charger 104, such as instructions for a charging current or voltage, etc. Charger 104 may be configured to provide a charging signal, SC, to battery controller 106. In an example, SC may contain realtime information on a charging process. In an example, SC may contain instructions for battery controller, for example, to modify an allowable battery or cell voltage during charging. For example, SC may instruct battery controller 106 to allow battery 102 to continue to charge above a normal operation charging voltage upper limit ($V_{UL}$) in order to reactivate dead lithium located in cells 108.

Charger 104 may have any of a variety of architectures and constructions known in the art of battery chargers and may have additional or alternate components and functions to the ones illustrated and described herein. In the illustrated example, charger 104 includes a processor or microcontroller 160 operably connected to a power supply 162 for providing electrical energy for charging battery 102. Power supply 162 can have any configuration known in the art and may include any of a variety of power electronics such as inverters and rectifiers for providing a voltage and current to battery 102. In the illustrated example, charger 104 includes a memory 164 that includes instructions for one or more charging protocols that define the parameters for charging battery 102. In the illustrated example, memory 164 includes a normal operation charge protocol 166 and a lithium reactivation charge protocol 168. As described more below, normal operation charge protocol may define normal operation charging parameters, such as a normal operation charging voltage and current, as well as acceptable ranges of battery temperature and pressure. Lithium reactivation charge protocol 168 may define alternate charging parameters, such as alternate charging currents and voltages. As shown in FIG. 1, in an example, battery controller 106 may also include a memory 134, a normal operation charge protocol 172 and a lithium reactivation charge protocol 174. As will be appreciated by a person having ordinary skill in the art, although battery controller 106 and charger 104 are shown as separate components, each having a corresponding processor 132/160 and memory 134/164, aspects of the present disclosure can be applied to any of a variety of computing device architectures. For example, aspects of the functionality of battery controller 106 and charger 104 can be allocated between the battery controller, charger, and other computing devices operably connected to the battery. For example, battery 102 may be connected to a load (not illustrated) for providing electrical power to the load, and one or more functions of battery controller 106 or charger 104 may be provided by a computing device located in the load. Battery 102 may be designed to provide power to any of a variety of loads. Non-limiting examples of loads are computing devices (cell phone, tablet, laptop, etc.), and land, air, or water-based electric vehicles (e.g., bicycle, automobile, motorcycle, manned or unmanned aerial vehicle, boat, submarine etc.). Thus, for example, a control system of an electric vehicle may be configured to monitor one or more conditions of battery 102, determine when to initiate a lithium reactivation charge protocol, and/or provide instructions to battery controller 106 or charger 104 to intentionally overcharge battery 102 to activate a redox shuttling additive to reactivate dead lithium.

Figure 2:
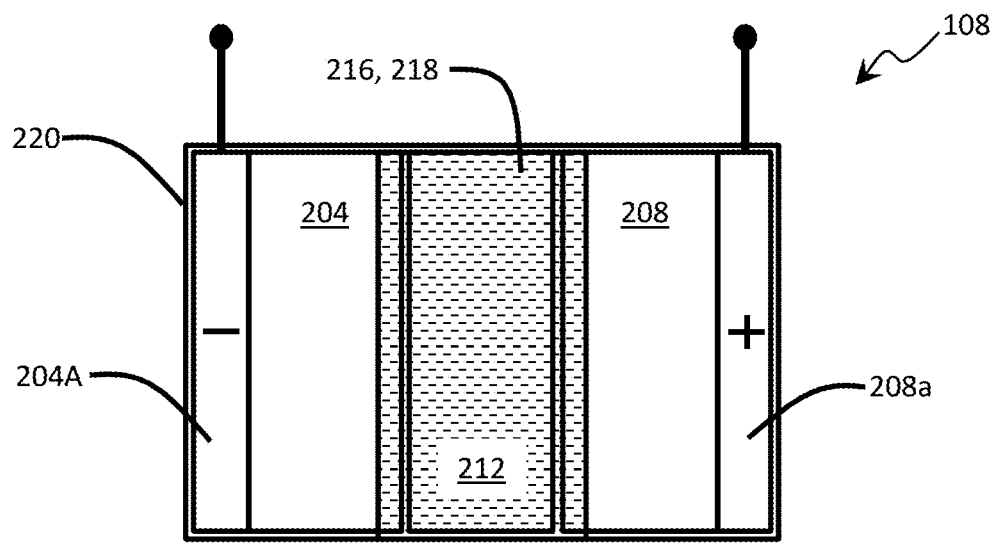
FIG. 2 is a schematic diagram of an example rechargeable lithium metal cell of the battery of FIG. 1.

FIG. 2 illustrates an example cell 108 of battery 102. FIG. 2 illustrates only some basic functional components of a cell 108. A real-world instantiation of the cell and/or battery 102 will typically be embodied using either a wound or stacked construction including other components, such as electrical terminals, seal(s), thermal shutdown layer(s), and/or vent(s), among other things, that, for ease of illustration, are not shown in FIG. 2. In the illustrated example, cell 108 includes a spaced-apart cathode 208 and anode 204, and a pair of corresponding respective current collectors 204A, 208A. A porous dielectric separator 212 is located between the cathode and anode 208, 204 to electrically separate the cathode and anode but to allow lithium ions, ions of an electrolyte 216, and ions of a redox shuttle additive 218 to flow therethrough. The porous dielectric separator 212 and/or one, the other, or both of cathode 208 and anode 204 may also be impregnated with the electrolyte 216 and shuttle additive 218. The cell 108 includes a container 220 that contains the current collectors 204A, 208A, cathode 208, anode 204, porous dielectric separator 212, and electrolyte 216.

The cathode and anode 208, 204 may comprise a variety of different structures and materials compatible with lithium-metal ions and electrolyte 216. Each of the current collectors 204A, 208A may be made of any suitable electrically conducting material, such as copper or aluminum, or any combination thereof. The porous dielectric separator 212 may be made of any suitable porous dielectric material, such as a porous polymer, among others.

Cathode 208 may be formed from a variety of materials such as a material of the general formula of $Li_xM_yO_z$, where M is a transition metal such as Co, Mn, Ni, V, Fe, or Cr, and x, y, z are chosen to satisfy valence requirements. In one or more embodiments, the cathode is a layered or spinel oxide material selected from the group comprising of $LiCoO_2$, $Li(Ni_{1/3}Mn_{1/3}Co_{1/3})O_2$, $Li(Ni_{0.8}Co_{0.15}Al_{0.05})O_2$, $LiMn_2O_4$, $Li(Mn_{1.5}Ni_{0.5})_2O_4$, or their lithium rich versions. In one or more embodiments, the cathode material is $LiCoO_2$ (charged to 4.4V vs. Li metal), NCA or NCM (622, 811) (charged to 4.30V vs. Li metal).

Anode 204 may be a thin lithium metal anode that, in the discharged state has a thickness in the range of 10 um-100 um, or 20 um-80 um, or 40 um-60 um. Although FIG. 2 schematically shows anode 204 adjacent current collector 208a, the anode material, e.g., sheets or films of lithium metal may be disposed on both sides of the current collector. In another example, cell 108 may have an anodeless cell design, where the cell initially only includes current collector 204A and lithium from cathode 208 is deposited on the anode current collector 204A during initial cell charging to form lithium anode 204. Further information regarding example materials and constructions of cells 108 can be found in PCT publication number WO 2017/214276, titled, "High energy density, high power density, high capacity, and room temperature capable 'anode-free' rechargeable batteries," which is incorporated by reference herein in its entirety.

Redox shuttling additive 218 may be any of a variety of redox shuttling additives known in the art, for example, 2,5-Di-tert-butyl-1,4-bis(2-methoxyethoxy)benzene (DBBB), 2,5-Di-tert-butyl-1,4-bis(methoxy)benzene (DDB), 2,5-Di-tert-butyl-1,4-bis(2,2,2-trifluoroethoxy)benzene (DBDFB), 2,5-Di-tert-butyl-1,4-bis(2,2,3,3-tetrafluoropropyloxy)benzene (DBTFP), 2,5-Di-tert-butyl-1,4-bis(4,4,4,3,2,2-hexafluorobutyloxy)benzene (DBHFB), 2,7-Diacetylthiathrene, 2,7-Dibromthianthrene, 2,7-diisobutanoylthianthrene, 2-acetylthianthrene, 2,5-Difluoro-1,4-dimethoxybenzene (DFDB), 2-(Pentafluorophenyl)-tetrafluoro-1,3,2-benzodioxaborole, $Li_2B_{12}F_{12}$, Tetraethyl-2,5-di-tert-butyl-1,4-phenylene diphosphate (TEDBPDP), 1,4-Bis[bis(1-methylethyl)phosphinyl]-2,5-dimethoxylbenzene (BPDB), 1,4-Bis[bis(1-methyl)phosphinyl]-2,5-difluoro-3,6-dimethyoxylbenzene (BPDFDB), Pentafluorophenyl-tetrafluorobenzyl-1,2-dioxoborone (PFPTFBDB), Ferrocene and their derivatives, phenothiazine derivatives, N,N-dialkyl-dihydrophenazine, 2,2,6,6-tetramethylpiperinyloxide (TEMPO), $Li_2B_{12}H_{12-x}F_x$ (x=9 and 12).

Figure 3:
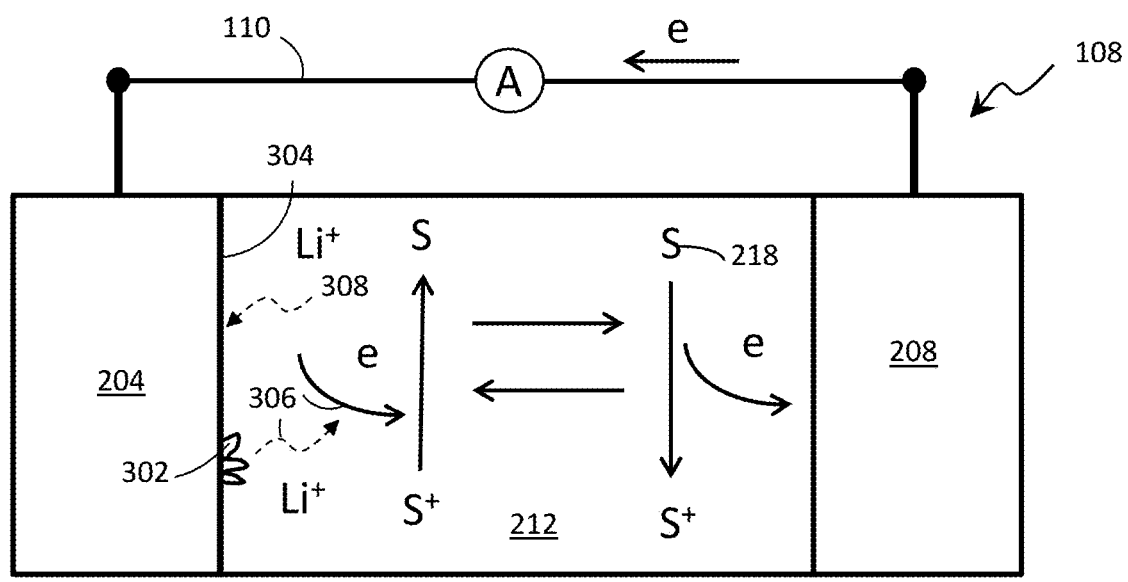
FIG. 3 illustrates an oxidation-reduction cycle for a redox shuttling additive that is designed and configured to reactivate dead lithium located on a surface of the anode.

FIG. 3 illustrates an oxidation-reduction cycle for redox shuttling additive 218 in connection with cell 108 that is designed and configured to reactivate dead lithium 302 located on a surface 304 of anode 204. In the illustrated example, shuttling additive 218 is designed and configured to have an oxidation potential that is slightly higher than a potential of cathode 208 when the cell voltage is at a normal operation charging voltage upper limit, $V_{UL}$. Thus, under normal charge-discharge cycling operation of cell 108, redox shuttling additive 218 is inert and not activated. When cell 108 is overcharged, for example, from charger 104 continuing to force a charging current through the cell after the cell voltage reaches $V_{UL}$, the cell voltage can begin to rise and without the overcharge protection provided by shuttling additive 218, the cell voltage could continue to rise until it reaches a voltage safety limit, in one example, approximately 5V. After the cell voltage exceeds the voltage safety limit, electrolyte 216 may begin to oxidize and decompose with rapid growth of cell internal impedance until the cell no longer functions and cathode 208 may begin to decompose and generate gases that can result in unsafe pressures. Continued charging current can also increase cell temperature. The increasing temperature and pressure can eventually cause cell 108 to explode and/or combust.

Redox shuttling additive 218, however, is designed to limit the cell voltage when the cell voltage begins to exceed $V_{UL}$. The potential of cathode 208 will rise until reaching the oxidation potential of shuttling additive 218, which in one example, is slightly higher, e.g., 0.01V to 1.0V higher than the cathode potential when the cell voltage is at $V_{UL}$. A voltage safety limit may define an upper limit of the useful shuttling additive activation potential, where chemical and electrochemical instabilities of the cathode and electrolyte begin to occur at or above the voltage safety limit. In an example, the redox potential of shuttling additive 218 is between a potential of the cathode when the cell is at $V_{UL}$ and a potential of the cathode when the cell reaches a voltage safety limit where electrochemical instabilities of the cathode and/or electrolyte begin to occur. When the potential of cathode 208 reaches the oxidation potential of shuttling additive 218, the shuttling additive will begin to be oxidized by cathode 208 to form cation-radicals S+. The electron, e, taken by cathode 208 from the shuttling additive can travel through the external circuit 110 to the anode surface 304. The shuttle additive cation-radical S+ is chemically and electrochemically stable toward cathode 208, separator 212 and electrolyte 216. Shuttle additive cation-radical S+ then migrates from cathode 208 to anode surface 304 by diffusing through electrolyte 216, and is then reduced to its neutral form, S, by accepting an electron from anode surface 304 or from dead lithium 302. The neutral additive, S, can then migrate back to cathode 208 through electrolyte 216 to complete the shuttling cycle. Repeated shuttling cycles with shuttling additive 218 can keep the cathode voltage constant at the oxidation potential of the redox shuttling additive and thus prevent further increase in cell voltage, thereby providing protection from cell overcharge for certain ranges of charging currents and cell temperatures.

As noted above, dead lithium 302 can result from normal charge-discharge cycling of cell 108. As the number of charge-discharge cycles increase, an increasing amount of lithium from anode 204 can become "dead lithium" by becoming electrically isolated from current collector 204A of the anode, thereby making the isolated or dead lithium unavailable for further discharge of energy and reducing the coulombic efficiency of the cell. One form of dead lithium is dendritic crystals of lithium physically and/or electrically isolated from the electric conduction pathway to the current collection by in-situ formed SEI layers. In addition to the overcharge protection as described above, the activation of redox shuttling additive 218 can enable a chemical reaction of the redox shuttling additive cation radical, S+, with dead lithium 302 to thereby free a lithium ion, Li+ and reactivate the dead lithium 302. As shown in FIG. 3, the reduction of redox shuttling additive 218 from S+ to S at anode surface 304 can generate a Li-ion, Li+, which is released, 306, from dead lithium 302. The generated Li-ion can then redeposit, 308, on anode surface 304 and thereby once again be in electrical communication with current collector 204A by accepting an electron, e, (coming from external circuit 110) on anode surface 204.

In an example, the reaction of shuttling additive cation-radical S+ with lithium metal is non-selective toward the lithium—the S+ radical can react with active lithium on anode surface 304 or dead lithium 302. If the shuttling additive cation radical S+ is reduced on the active lithium anode surface 304, the net result is no change. If the redox shuttling additive cation radical reacts chemically with dead lithium 302, however, the formed Li-ion can migrate to the active lithium anode surface 304 and be reduced electrochemically to redeposit as additional active lithium, thereby reactivating the dead lithium and increasing the capacity and life of cell 108. The net result, therefore, is dead lithium 302 is converted to active lithium.

Because the reaction between cation-radical S+ of shuttling additive 218 and lithium is a surface reaction, the relative proportion of reactions on active lithium anode surface 304 and on the surface of dead lithium 302 can depend on the morphology and surface area of the dead lithium. In an example, and as noted above, cell 108 is an advanced lithium metal rechargeable cell and anode 204 includes a very thin layer of lithium metal, for example, a thickness of 50 µm or less, which provides high energy density. In such an example, dead lithium 302 can represent a significant percentage of the total amount of lithium in cell 108. In such cases, activation of shuttling additive 218 to convert dead lithium 302 to active lithium can have a significant impact on cycle life of cell 108.

The concentration of redox shuttling additive 218 in electrolyte 216 may vary. The shuttling mechanism provided by shuttling additive 218 includes the migration of the additive species from cathode 208 to anode 204 and back, so the rate of migration is a function of the concentration of shuttling additive 218 and its diffusion rate. Higher concentrations of redox shuttling additive 218 may be used for higher activation rates of dead lithium 302. In one example, an upper limit of the concentration of redox shuttling additive 218 is controlled by the solubility of the additive in electrolyte 216. The concentration of redox shuttling additive 218 can be controlled and optimized from 0.01M to the saturation concentration in a given electrolyte 216.

Figure 4:
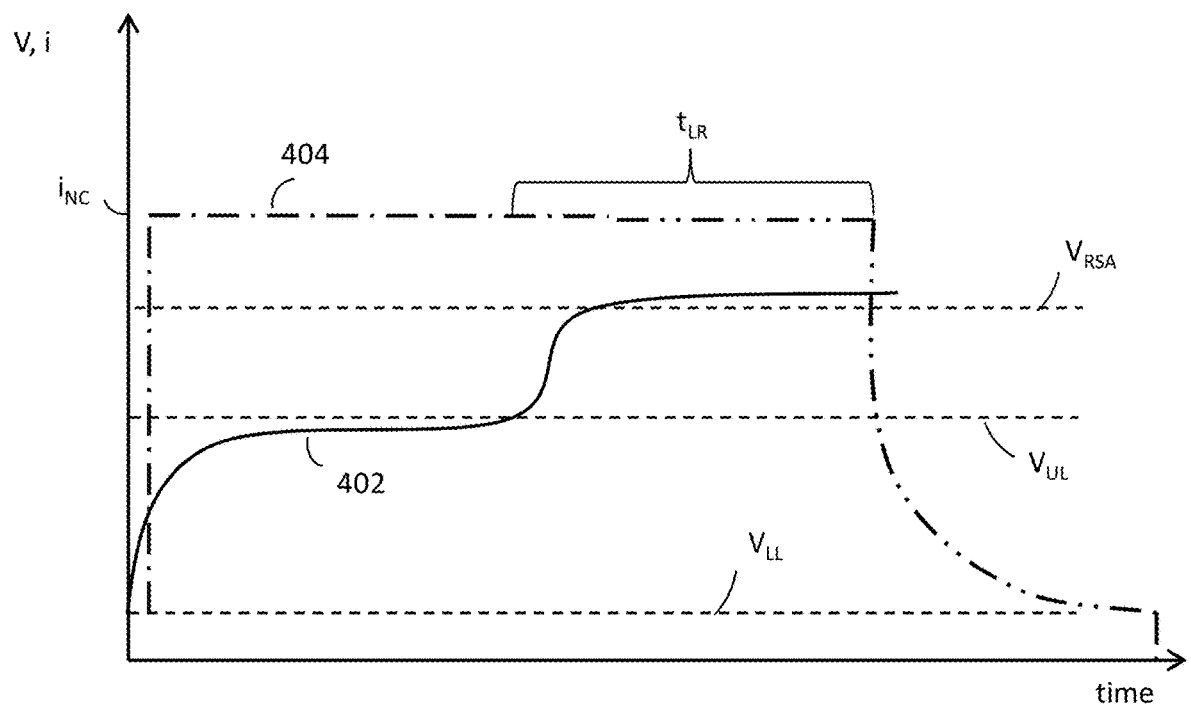
FIG. 4 is a graph of cell voltage and charging current versus time, conceptually illustrating a charging current and cell voltage during a normal operation charging process according to a normal operation charge protocol and example charging currents during a lithium reactivation charging process for intentionally overcharging the cell to activate redox shuttling additives.

FIG. 4 conceptually illustrates a cell voltage 402 and charging current 404 during a lithium reactivation charging process according to a lithium reactivation charge protocol. During normal charge and discharge cycling of battery 102, battery controller 106 is configured to maintain cell voltages above a lower voltage limit, $V_{LL}$, and below a normal operation charging voltage upper voltage limit, $V_{UL}$. FIG. 4 shows, in a first portion of the illustrated plot of cell voltage 402, an example trajectory of a cell voltage 402 versus time during a normal operation charging process from a fully discharged state at a corresponding cell voltage at $V_{LL}$ to a fully charged state at $V_{UL}$. As shown in FIG. 4, charger 104 may be configured to provide a constant charging current, $i_{NC}$ and maintain that constant value as the cell voltage 402 increases and lithium ions stored in cathode 208 migrate to anode 204. During a normal operation charging process, as cell voltage 402 reaches the upper voltage limit, $V_{UL}$, charger 104 may be configured to begin to reduce the charging current 404 and then stop the charging current after the cell voltage reaches $V_{UL}$ or after the cell is fully charged using any normal operation charging process known in the art.

$V_{UL}$ can vary according to the specific cathode materials, performance requirements and application battery 102 is designed for. In an example, $V_{UL}$ can be in the range of 2.5V to 4.5V. In an example, $V_{UL}$ corresponds to a condition where substantially all of the lithium ions stored at intercalation sites of cathode 208 have been removed, for example, in cases where cathode 208 is formed from materials having an olivine structure, such as LiFePO4. In other examples, $V_{UL}$ corresponds to a condition where a portion of lithium ions remain in cathode 208 when the cell voltage reaches at $V_{UL}$, but further removal of lithium ions would damage the cathode, for example, by destabilizing the crystal structure of the cathode material, causing degradation of the cathode, leading to a rapid reduction in cell storage capacity during cell cycling. Examples of such cathode materials, where lithium ions remain at $V_{UL}$ but further removal will begin to damage the cathode, include materials having a hexagonal-layered structure or cubic spinel-related structure, such as LiCoO2 and NMC.

Charger 104 may include a normal operation charge protocol stored in memory 164, the normal operation charge protocol including instructions for charging battery 102, for example, by providing instructions specifying a constant normal operation charging current to be applied until a measured voltage reaches a target value, such as within a threshold value of $V_{UL}$, to charge the battery until the cell voltages 402 reach normal operation charging voltage upper voltage limit, $V_{UL}$. In other examples, battery controller 106 includes a normal operation charge protocol 172 stored in memory 134 and provides instructions, e.g., via battery signal, SB, to charger 104 for charging battery 102. Battery controller 106 and/or charger 104 may also be configured to monitor battery temperature signal ST and pressure signal SP and discontinue charging if the temperature or pressure exceeds allowable limits. Battery controller 106 may also be configured to instruct charger 104 to cease charging, or disconnect circuit 110, when cell voltages exceed $V_{UL}$ and during discharge, discontinue discharge when the cell voltages reach lower voltage limit, $V_{LL}$, in both cases, to prevent cell damage.

Charger 104 and/or battery controller 106 may also be configured to select lithium reactivation charge protocol 168 (174) to charge battery 102 according to a lithium reactivation charging process. As noted above, cells 108 of battery 102 may contain redox shuttle additive 218 that is designed and configured to be inert during normal operation charge-discharge cycles, but has an oxidation potential that is slightly higher, e.g., 0.01-1.0V higher, than a potential of cathode 208 when the cell voltage is at $V_{UL}$. As shown in FIG. 4, in one example, lithium reactivation charge protocol 168 may include instructions for continuing to apply charging current 404 after the cell voltage 402 begins to exceed $V_{UL}$, which would normally be considered an overcharge condition. The illustrated example shows continued application of charging current 404 at approximately the same constant current charging value, $i_{NC}$, as during normal operation charging, but applied for an extended dead lithium release time duration, $t_{LR}$, to intentionally increase the potential of cathode 208 above $V_{UL}$ to activate shuttle additives 218. As shown in FIG. 4, the continued application of charging current 404 after the cell is fully charged causes cell voltage 402 to increase until the cell voltage reaches a redox shuttling additive voltage, $V_{RSA}$, which is a cell voltage corresponding to a cathode potential equal to the redox potential of redox shuttling additive 281. Cell voltage 402 then plateaus at $V_{RSA}$ as the redox shuttling additive 281 becomes activated and provides the overcharge protection and dead lithium reactivation functions described above. Charging current 404 can then be reduced or terminated once a desired extended charge duration, $t_{LR}$, has been reached. Example charging current 404 is merely provided by way of example, and any of a variety of charging current profiles may be used for increasing the potential of cathode 208 to a point that would normally be considered an overcharge condition to intentionally activate shuttle additives 218. Conventional battery chargers, by contrast, are designed to discontinue charging when the cell voltage reaches or exceeds a normal charging upper limit, such as $V_{UL}$. And conventional batteries that include shuttling additives for overcharge protection are specifically designed to avoid activating the shuttling additives. In conventional batteries, shuttling additives are typically only included as a backup in the event of an inadvertent overcharge, for example, due to a battery charger malfunction. Battery controller 106 and charger 104, by contrast, are specifically designed and configured to intentionally and selectively activate shuttling additives 218 by intentionally overcharging battery 102 to reactivate dead lithium 302 with the activated shuttling additives.

Lithium reactivation charge protocol 168 and/or 174 may also include instructions for determining when to activate a lithium reactivation charging process. In one example, battery controller 106 and/or charger 104 may be configured to estimate an amount of dead lithium that has formed in cells 108 and initiate a lithium reactivation charging process after a threshold amount of dead lithium has formed. The rate of dead lithium growth will vary according to the particular chemical system and the usage conditions, such as rate of cycling, battery temperature, age of the cells, etc. Battery controller 106 and/or charger 104 may be configured to monitor battery conditions to determine a lithium reactivation charge frequency, for example, a lithium reactivation charging process can be performed for N number of sequential charging cycles after M number of normal operation charging cycles. M and N can be predetermined values stored in memory 164 and/or 134, or can be calculated based on an operating history of battery 102. For example, dead lithium growth may occur more rapidly at faster charging rates, slower discharge rates, higher cycling areal capacity, and for electrolytes with low salt concentration, and battery controller 106 and/or charger 104 may calculate a value for M based on one or more of those factors. In an example, a lithium reactivation charging process can also be manually selected at any time, for example, selected by a user via a user input at a user interface communicatively coupled to battery controller 106 and/or charger 104.

In an example, battery controller 106 and/or charger 104 may be configured to monitor cell pressure and/or cell impedance to identify when dead lithium exceeds a threshold value and activate a lithium reactivation charging process. For example, dead lithium is often associated with lithium dendrite growth, which can create pressure within cells 108 as the dendritic crystals form and press against adjacent internal structures of battery 102. Battery controller 106 and/or charger 104 can monitor pressure signal SP and activate a lithium reactivation charging process when SP exceeds a threshold value.

Battery controller 106 and/or charger 104 can also be configured to determine a length of time to activate shuttling additives 218. For example, as shown in FIG. 4, lithium reactivation charging current 404 applies normal charging current $i_{NC}$ for an extended time $t_{LR}$ after cell voltage reaches $V_{UL}$ to activate the shuttling additives. Battery controller 106 and/or charger 104 may be configured to determine $t_{LR}$ according to, for example, a target amount of lithium reactivation. In one example, only partial activation capacity can be used to convert dead lithium into active lithium. Thus, additive activation capacity may be varied to have significant amount of dead lithium reacted. For example, for a cell capacity of 100%, a shuttling additive activation capacity can be in the range of 1% to 1000%.

Battery controller 106 and/or charger 104 can also be configured to determine a lithium reactivation charging current at the redox shuttling additive activation voltage. The activation of redox shuttling additive 218 at its oxidation potential is dependent on shuttling additive diffusion kinetics and the concentration of the shuttling additive in electrolyte 216. Battery controller 106 and/or charger 104 may be configured to determine a lithium reactivation charging current that corresponds to a maximum shuttling additive diffusion value to prevent overcharge and overheating. For example, battery controller 106 and/or charger 104 may be configured to determine a lithium reactivation charging current that corresponds to a maximum capacity of the shuttling additive. If the charging current were to be increased above that value, the activation rate would be higher than the diffusion limit, the shuttling additive may not be able to keep up with charging current to maintain the cathode 208 at the same SOC, resulting in an increase in cathode SOC or higher cell voltage than the shuttling additive oxidation potential which could lead to cell heating and damage. In one example, the lithium reactivation charging current is in the range of 0.01 C to 1.0 C and in some examples, in the range of 0.05 C to 0.5 C.

The diffusion limit of shuttling additive 218 is affected by a temperature and viscosity of electrolyte 216. In one example, electrolyte 216 is a high concentration salt electrolyte having a relatively high viscosity, which reduces shuttling additive diffusion and migration within the electrolyte. Higher battery operation temperature reduces the viscosity of electrolyte 216 which can aid shuttling additive migration. Higher temperatures, however, may cause electrolyte 216 to be less stable towards activated shuttling additive cation radicals. A maximum battery temperature, therefore, may be set and stored in memory 164 and/or memory 134 to minimize the reactivity between the shuttling additive cation radical and the electrolyte components. In addition, the shuttling process can generate heat such that a lower operation temperature may be preferable. In one example, battery controller 106 and/or charger 104 may be configured to determine an optimal and/or maximum lithium reactivation charging current according to a battery temperature and corresponding electrolyte viscosity and also may be configured to not allow a lithium reactivation charging process to occur above a maximum operating temperature to prevent unwanted chemical reactions between the electrolyte and shuttling additive. Battery controller 106 and/or charger 104 may also be configured to monitor a battery operation temperature and allow a lithium reactivation charging process to occur until the battery temperature reaches a maximum allowable value due to the heat generated by the process. In one example, an allowable battery temperature for a lithium reactivation charging process may be in the range of −20 C to 80 C.

By way of a non-limiting example of a lithium reactivation process, a shuttling additive may have an activation voltage at around 4.25V and a cell normal operation charging voltage may be approximately 4.2V. After the cells have been cycled at the cell normal operation voltage for X number of cycles, where in one example, X is between 5 and 100, at cycle number (X+1), the cells are charged to 4.2V at normal charge rate/regimes. At the end of the normal charge, charging continues at a charging rate selected from C/20 to C/5 until the cell voltage reaches a 4.3V cut off or reaches a pre-determined time, in one example, ranging from 1 hour to 100 hours, or a pre-determined overcharge capacity (mAh), whichever is reached first. If the overcharge capacity (mAh) is achieved before reaching the 4.3V cut off limit, the rate of charge can be reduced, for example, to half of its original value to achieve the pre-determined overcharge capacity (mAh) or until the maximum time, for example, 100 hours, is reached. During this process, the shuttling additive with oxidation potential at 4.25V is activated and dead lithium is converted into active lithium. After the above charging step, the cell can be discharged under normal operation conditions and the process can be repeated after every X number of cycles until the cell reaches end of service.

Figure 5:
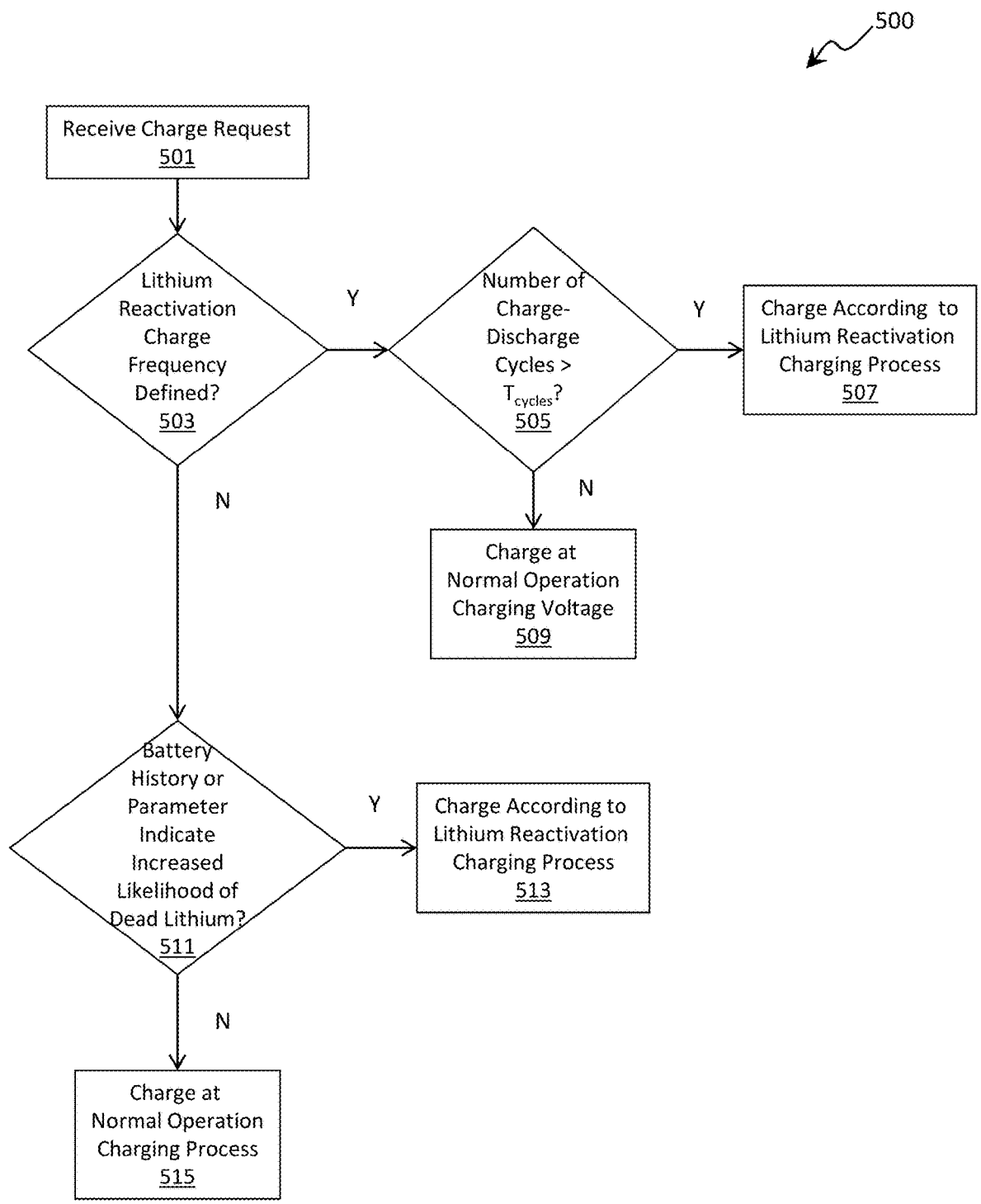
FIG. 5 illustrates one example method for charging a lithium metal battery.

FIG. 5 illustrates one example method for charging a lithium metal battery. Method 500 may be performed by a computing device, such as battery controller 106 and/or charger 104. In block 501, the computing device may receive a charge request, for example, from a user connecting battery 102 with charger 104 and powering on the charger. At block 503, the computing device may check whether a lithium reactivation charge frequency has been defined, and if yes, at block 505, determine if the prior number of normal operation charge-discharge cycles is greater than a threshold number, $T_{cycles}$. If yes, at block 507, the computing device may initiate a lithium reactivation charging process by intentionally increasing cell voltages above a normal operation charging voltage upper limit ($V_{UL}$) to an overcharge condition to activate shuttling additives and reactivate dead lithium. If the decision at block 505 is no, and the number of cycles has not yet reached $T_{cycles}$, then the computing device can charge the battery according to a normal operation charging process.

If the decision at block 503 is no, and there is no predetermined lithium reactivation charge frequency, then at block 511, the computing device can determine whether a battery operation history and/or a battery parameter indicates an increased likelihood of dead lithium above a threshold value. For example, as described above, the computing device may determine a likelihood of dead lithium according to an operating history of the battery, such as number of rapid charges and average operating temperature of the battery, or any other calculation methodology known in the art for correlating battery operating history to dead lithium and/or dendritic lithium growth. In an example, the computing device may compare an impedance or pressure of the battery to a threshold value to determine a likelihood of dead lithium. If the computing device determines there is an increased likelihood of dead lithium above a threshold value, then at block 513, the computing device can initiate charging according to a lithium reactivation charging process and if not, then at block 515 the computing device can initiate charging according to a normal operation charging process.

Example 1—Conventional Lithium Ion Battery Electrolyte

Figure 6:
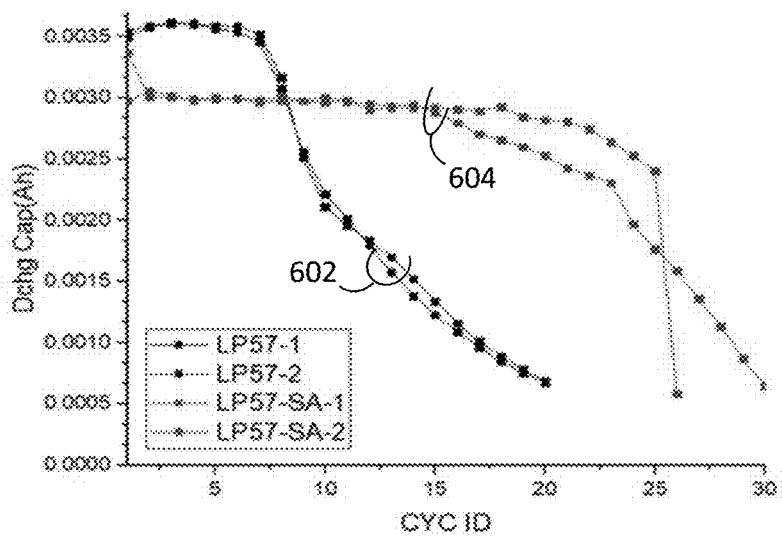
FIG. 6 illustrates discharge capacities from lithium metal test cells with and without a redox shuttling additive and with a common lithium ion battery electrolyte.

FIG. 6 illustrates test data from an example test of coin cells using 20 μm thick thin lithium anode and NMC cathode built with 1.2M LiPF6/EC:EMC=3:7 with or without 0.2M DBBB shuttling additive. The cells were cycled by charging to 4.0V and discharged to 2.5V under 0.1 C rate. As indicated in FIG. 6, cells without DBBB additive exhibited 7 cycles with stable delivered capacities before showing the significant drop on delivered capacities (discharge capacity curves 602). While cells with DBBB additive delivered slightly lower capacities during cycling due to the DBBB shuttling additive activation (100% overcharge control) at ~3.9V, but with ~23-25 cycles stable capacities delivery before the dropping of the delivered capacities in the later cycles (discharge capacity curves 604). The average lithium cycling coulombic efficiency per cycle is estimated to be improved from ~77% for the control cells to 90.5% for the testing cells with DBBB additive. Although the DBBB additive is not ideal for the Li-NMC (>4V) system due to its low activation voltage (~3.9V), this example shows that activation of shuttling additives exhibits beneficial effects on cell cycle life.

Example 2—High Concentration Electrolyte for Li Metal Anode

Figure 7:
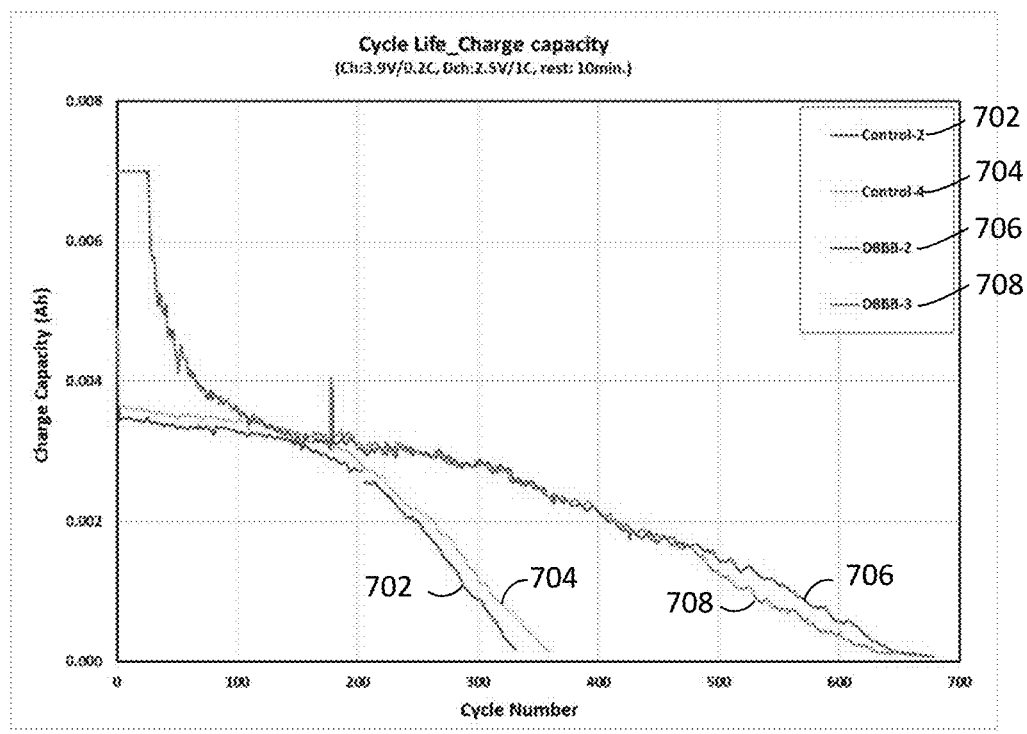
FIGS. 7-10 illustrate test data from lithium metal test cells with and without a redox shuttling additive and with a high concentration electrolyte designed for lithium metal batteries.
Figure 8:
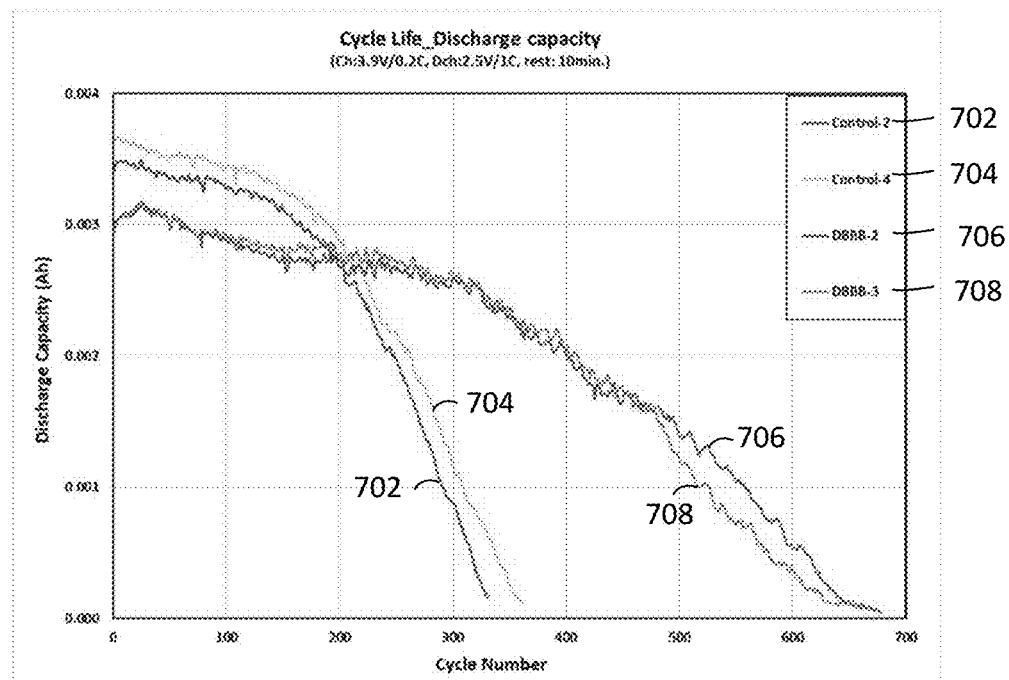
Figure 9:
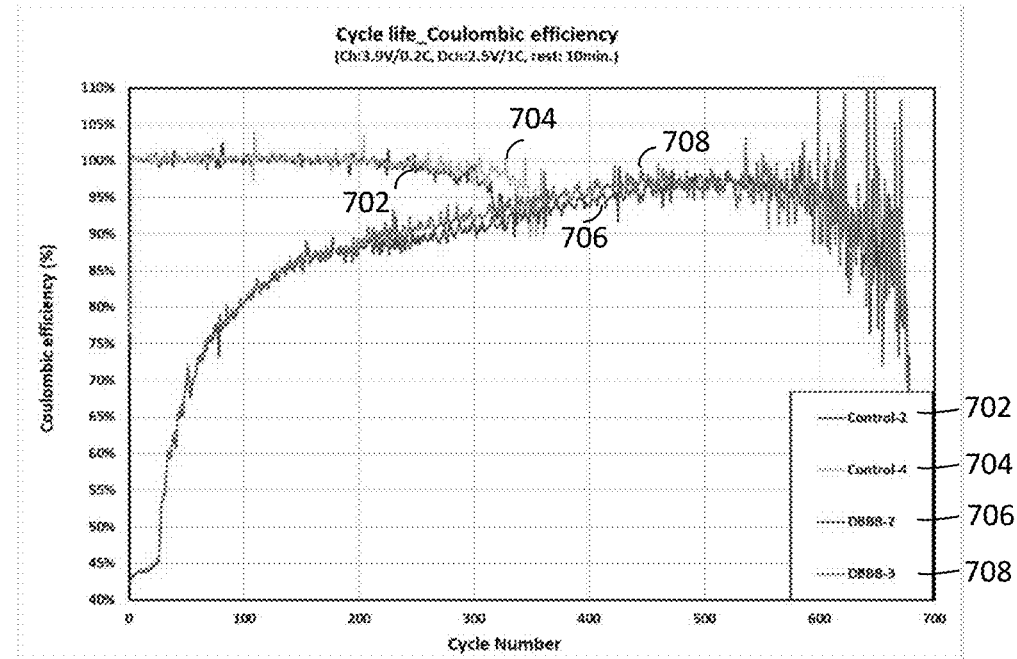
Figure 10:
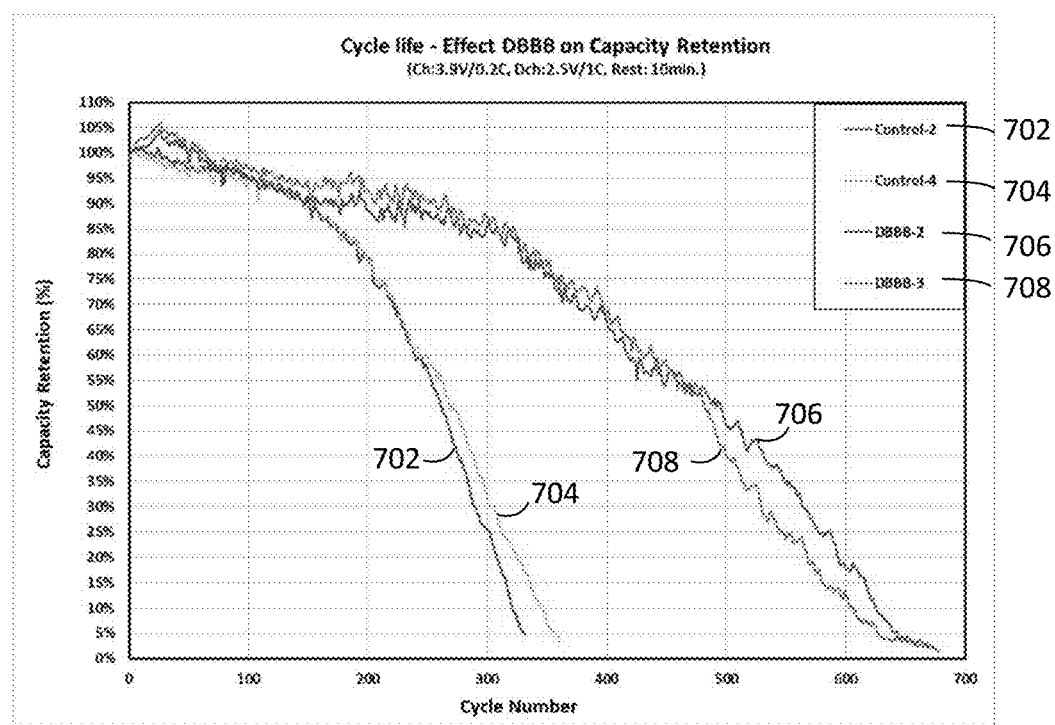

To demonstrate the impact of a shuttling additive on the stability of a lithium metal rechargeable cell system, the same coin cells as in Example 1 were built using a 2M LiFSI/FEC:EMC=2:8 electrolyte that provides more stable lithium metal cycling, either without the DBBB additive (control 2 (702), control 4 (704)) or with 0.2M DBBB additive (DBBB-2 (706), DBBB-3 (708)). The cells were charged at 0.2 C rate to 3.9V and discharged at 1.0 C rate to 2.5V. Due to the presence of DBBB, the testing group cells 706, 708 were partially overcharged at each cycle before reaching 3.9V due to the DBBB activation at around 3.85V in this electrolyte. The charging capacity and discharging capacity are shown in FIGS. 7 and 8, respectively. Although the charging capacities for cells 706, 708 with DBBB additive in the initial 100 cycles are much higher than the control cells 702, 704 (FIG. 7), the actual stored capacity is lower, as represented by the lower discharge capacities (FIG. 8) at the same cycles. Again, the above phenomenon is also shown in cycling coulombic efficiency (FIG. 9). FIG. 10 shows the impact of DBBB activation on the cell cycling capacity retention.

As seen in FIG. 10, the presence and activation of DBBB additive in the electrolyte does not show a detrimental effect on cell long-term cycling stability with similar capacity retention observed during the initial 150 cycles (90% at 150 cycle). At 250 cycles, cells 706, 708 with DBBB additive exhibited much higher capacity retention (87-90%) than control cells 702, 704 (57-60%). The redox shuttling additive is compatible with the electrolyte system for the lithium metal rechargeable batteries using the thin lithium metal as anode. Longer cycle life is demonstrated for cells with redox shuttling additive over the cells without the redox shuttling additive. The results are consistent with the mechanism described above.

As shown in FIGS. 7 and 9, the overcharge capacity and coulombic efficiency are not constant for cells 706, 708 with DBBB additive throughout the cycling test even under the same charging process control. The coulombic efficiency slowly increases along with cycle numbers and reached above 90% at ~250 cycles and 95% at ~400 cycles. This may indicate that the DBBB additive is not totally stable in this cell system. The DBBB additive is consumed over time within the cell and becomes less and less effective. However, the coulombic efficiency maintained at below 100% throughout the cycling test—indicating the remainder of the DBBB additive still partially functions at end of the test (over 600 cycles). The control cells maintained close to 100% coulombic efficiency up to 200 cycles and decreased slightly after 200 cycles, correlating well with fast capacity fade at >200 cycles (FIG. 10).

Any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
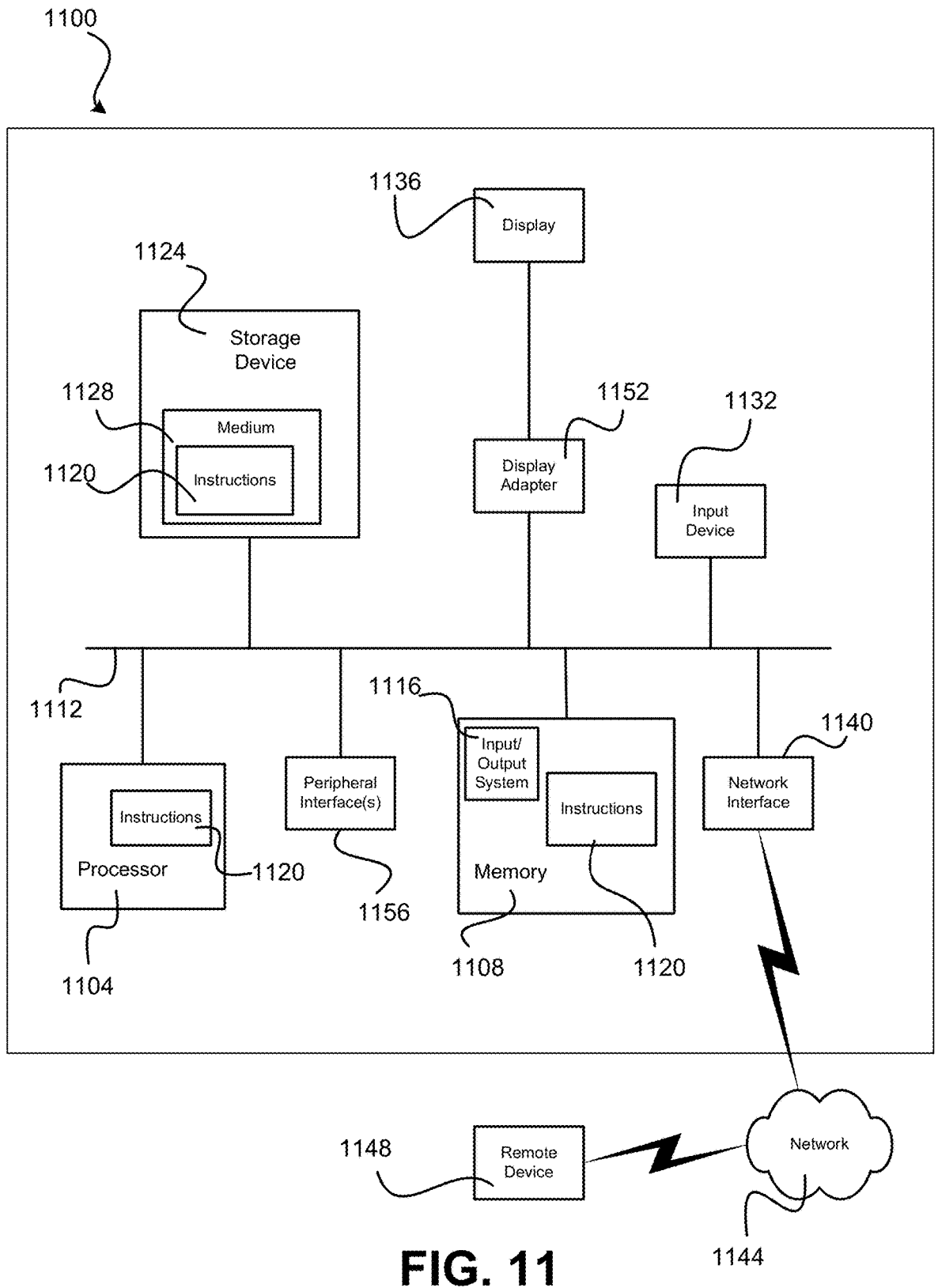
FIG. 11 is a schematic diagram of an example computing system that may be used to implement aspects of the present disclosure.

FIG. 11 shows a diagrammatic representation of one embodiment of a computing device in the exemplary form of a computer system 1100 within which a set of instructions for causing a control system, such as the battery controller 106 and charger 104 of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Memory 1108 may include various components (e.g., machine-readable media) including, but not limited to, a random access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

In some examples, a machine-readable storage medium of the present disclosure may include containing machine-readable instructions for performing a method of charging a lithium metal battery having a normal operation charging voltage upper limit ($V_{UL}$), a redox shuttling additive having an oxidation potential that is greater than $V_{UL}$, and a lithium metal anode having a current collector and dead lithium that is electrically isolated from the current collector. The machine-readable instructions include instructions for charging the lithium metal battery at a lithium reactivation charging voltage, the lithium reactivation charging voltage being greater than $V_{UL}$; oxidizing the redox shuttling additive to form a redox shuttling additive cation-radical; reacting the cation-radical with the dead lithium to form a reduced shuttling additive and a lithium ion; and redepositing the lithium ion on the anode. Such exemplary machine-readable storage medium may also include one or more of the following features: the instructions further comprise instructions for determining a diffusion limit of the redox shuttling additive cation-radical, and determining a lithium reactivation charging current according to the diffusion limit; the instructions further comprise instructions for monitoring a voltage of the lithium metal battery and reducing a lithium reactivation charging current in response to the voltage of the lithium metal battery exceeding the lithium reactivation charging voltage; the instructions further comprise instructions for monitoring a temperature of the lithium metal battery and determining a lithium reactivation charging current according to the monitored temperature; the instructions further comprise instructions for increasing or decreasing the lithium reactivation charging current in response to a change in the monitored temperature; the lithium metal anode includes a layer of lithium having a thickness, wherein the thickness of the layer of lithium is less than 50 µm when the battery is initially manufactured and prior to an initial charging of the battery; the instructions further comprise instructions for determining to initiate a lithium reactivation charging process and performing the charging, oxidizing, reacting, and redepositing steps in response to determining to initiate the lithium reactivation charging process; the instructions for the step of determining to initiate a lithium reactivation charging process includes monitoring at least one of a pressure of the lithium metal battery, an impedance of the lithium metal battery, and a number of charge-discharge cycles, and charging at the lithium reactivation charging voltage when one or more of the monitored pressure, impedance, and charge-discharge cycles exceeds a corresponding threshold value; the lithium metal battery includes a cathode having intercalation sites that receive lithium ions during discharge of the battery, further wherein $V_{UL}$ is a voltage corresponding to a condition where substantially all of the lithium ions stored in the intercalation sites have been removed or a condition where further removal of lithium ions from the cathode would damage the cathode; the lithium reactivation charging voltage is less than a voltage safety limit, wherein unwanted chemical reactions begin to occur above the voltage safety limit; and the lithium metal battery includes an electrolyte and a cathode, wherein the unwanted chemical reactions include at least one of oxidation of the electrolyte and decomposition of the cathode resulting in the production of one or more gases.

In some examples, a machine-readable storage medium of the present disclosure may include machine-readable instructions for performing a method of charging a lithium metal battery having a cathode and a redox shuttling additive. The machine-readable instructions include instructions for determining a likelihood of dead lithium on an anode of the lithium metal battery; and initiating a lithium reactivation charging process in response to the determined likelihood being greater than a threshold value; wherein the lithium reactivation charging process includes charging the battery with a lithium reactivation charging current, the lithium reactivation charging current designed and configured to increase a potential of the cathode above a normal operation charging voltage upper limit ($V_{UL}$) to oxidize the redox shuttling additive and reactivate the dead lithium with the redox shuttling additive. Such an exemplary machine-readable storage medium may also include one or more of the following features: instructions for the step of determining a likelihood of dead lithium includes instructions for monitoring at least one of a pressure of the lithium metal battery, an impedance of the lithium metal battery, and a number of charge-discharge cycles, and charging the battery with the lithium reactivation charging current when one or more of the monitored pressure, impedance, and charge-discharge cycles exceeds a corresponding threshold value; the lithium metal battery includes a cathode having intercalation sites that receive lithium ions during discharge of the battery, further wherein $V_{UL}$ is a voltage corresponding to a condition where substantially all of the lithium ions stored at the intercalation sites have been removed or a condition where further removal of lithium ions from the cathode would damage the cathode; the lithium metal battery includes an anode having a layer of lithium metal having a thickness, wherein the thickness of the layer of lithium is less than 50 μm when the battery is initially manufactured and prior to an initial charging of the battery; and the lithium metal battery includes an anode having a current collector, wherein the dead lithium is lithium metal located on a surface of the anode that is electrically isolated from the current collector.

In some examples, a machine-readable storage medium of the present disclosure may include machine-readable instructions for performing a method of charging a lithium metal battery having a lithium metal anode, a redox shuttling additive and dead lithium on the anode. The machine-readable instructions include instructions for intentionally overcharging the battery to activate the redox shuttling additive and form shuttling additive cation radicals for chemically reacting with the dead lithium to release lithium ions from the dead lithium. Such an exemplary machine-readable storage medium may also include one or more of the following features: the instructions for the step of intentionally overcharging the battery includes instructions for charging the lithium metal battery at a lithium reactivation charging voltage, the lithium reactivation charging voltage being greater than a normal operation charging voltage upper limit ($V_{UL}$); the redox shuttling additive has an oxidation potential that is greater than $V_{UL}$; the instructions for the step of intentionally overcharging the battery includes instructions for charging the battery with a lithium reactivation charging current, the lithium reactivation charging current designed and configured to increase a potential of a cathode of the battery above a normal operation charging voltage upper limit ($V_{UL}$) to oxidize the redox shuttling additive; the lithium metal battery includes a cathode having intercalation sites that receive lithium ions during discharge of the battery, further wherein $V_{UL}$ is a voltage corresponding to a condition where substantially all of the lithium ions stored in the intercalation sites have been removed or a condition where further removal of lithium ions from the cathode would damage the cathode; the instructions for the step of charging the battery with a lithium reactivation charging current includes instructions for continuing to apply a normal operation charging current for a an extended duration after a cell voltage of the battery reaches $V_{UL}$; the instructions for the step of charging the battery with a lithium reactivation charging current includes applying a charging current that is sufficient to activate the redox shuttling additive and less than a diffusion limit of the shuttling additive; and the anode includes a current collector, wherein the dead lithium is lithium metal located on a surface of the anode that is electrically isolated from the current collector.

In some examples, aspects of the present disclosure may also include a computing device of the present disclosure configured to be operably coupled to a lithium metal battery having a normal operation charging voltage upper limit ($V_{UL}$), a redox shuttling additive having an oxidation potential that is greater than $V_{UL}$, and a lithium metal anode having a current collector and dead lithium that is electrically isolated from the current collector. The computing device includes a processor configured to charge the lithium metal battery at a lithium reactivation charging voltage, the lithium reactivation charging voltage being greater than $V_{UL}$; oxidize the redox shuttling additive to form a redox shuttling additive cation-radical; react the cation-radical with the dead lithium to form a reduced shuttling additive and a lithium ion; and redeposit the lithium ion on the anode. Such exemplary device may also include one or more of the following features: the processor is further configured to determine a diffusion limit of the redox shuttling additive cation-radical, and determining a lithium reactivation charging current according to the diffusion limit; the processor is further configured to monitor a voltage of the lithium metal battery and reducing a lithium reactivation charging current in response to the voltage of the lithium metal battery exceeding the lithium reactivation charging voltage; the processor is further configured to monitor a temperature of the lithium metal battery and determining a lithium reactivation charging current according to the monitored temperature; the processor is further configured to increase or decrease the lithium reactivation charging current in response to a change in the monitored temperature; the lithium metal anode includes a layer of lithium having a thickness, wherein the thickness of the layer of lithium is less than 50 μm when the battery is initially manufactured and prior to an initial charging of the battery; the processor is further configured to determine to initiate a lithium reactivation charging process and performing the charging, oxidizing, reacting, and redepositing steps in response to determining to initiate the lithium reactivation charging process; the step of determining to initiate a lithium reactivation charging process includes monitoring at least one of a pressure of the lithium metal battery, an impedance of the lithium metal battery, and a number of charge-discharge cycles, and charging at the lithium reactivation charging voltage when one or more of the monitored pressure, impedance, and charge-discharge cycles exceeds a corresponding threshold value; the lithium metal battery includes a cathode having intercalation sites that receive lithium ions during discharge of the battery, further wherein $V_{UL}$ is a voltage corresponding to a condition where substantially all of the lithium ions stored in the intercalation sites have been removed or a condition where further removal of lithium ions from the cathode would damage the cathode; the lithium reactivation charging voltage is less than a voltage safety limit, wherein unwanted chemical reactions begin to occur above the voltage safety limit; and the lithium metal battery includes an electrolyte and a cathode, wherein the unwanted chemical reactions include at least one of oxidation of the electrolyte and decomposition of the cathode resulting in the production of one or more gases.

In some examples, aspects of the present disclosure may also include a computing device of the present disclosure configured to be operably coupled to a lithium metal battery having a cathode and a redox shuttling additive. The computing device includes a processor configured to determine a likelihood of dead lithium on an anode of the lithium metal battery; and initiate a lithium reactivation charging process in response to the determined likelihood being greater than a threshold value; wherein the lithium reactivation charging process includes charging the battery with a lithium reactivation charging current, the lithium reactivation charging current designed and configured to increase a potential of the cathode above a normal operation charging voltage upper limit ($V_{UL}$) to oxidize the redox shuttling additive and reactivate the dead lithium with the redox shuttling additive. Such exemplary device may also include one or more of the following features: the step of determining a likelihood of dead lithium includes monitoring at least one of a pressure of the lithium metal battery, an impedance of the lithium metal battery, and a number of charge-discharge cycles, and charging the battery with the lithium reactivation charging current when one or more of the monitored pressure, impedance, and charge-discharge cycles exceeds a corresponding threshold value; the lithium metal battery includes a cathode having intercalation sites that receive lithium ions during discharge of the battery, further wherein $V_{UL}$ is a voltage corresponding to a condition where substantially all of the lithium ions stored at the intercalation sites have been removed or a condition where further removal of lithium ions from the cathode would damage the cathode; the lithium metal battery includes an anode having a layer of lithium metal having a thickness, wherein the thickness of the layer of lithium is less than 50 μm when the battery is initially manufactured and prior to an initial charging of the battery; and the lithium metal battery includes an anode having a current collector, wherein the dead lithium is lithium metal located on a surface of the anode that is electrically isolated from the current collector.

In some examples, aspects of the present disclosure may also include a computing device of the present disclosure configured to be operably coupled to a lithium metal battery having a lithium metal anode, a redox shuttling additive and dead lithium on the anode. The computing device includes a processor configured to intentionally overcharge the battery to activate the redox shuttling additive and form shuttling additive cation radicals for chemically reacting with the dead lithium to release lithium ions from the dead lithium. Such exemplary device may also include one or more of the following features: the step of intentionally overcharging the battery includes charging the lithium metal battery at a lithium reactivation charging voltage, the lithium reactivation charging voltage being greater than a normal operation charging voltage upper limit ($V_{UL}$); the redox shuttling additive has an oxidation potential that is greater than $V_{UL}$; the step of intentionally overcharging the battery includes charging the battery with a lithium reactivation charging current, the lithium reactivation charging current designed and configured to increase a potential of a cathode of the battery above a normal operation charging voltage upper limit ($V_{UL}$) to oxidize the redox shuttling additive; the lithium metal battery includes a cathode having intercalation sites that receive lithium ions during discharge of the battery, further wherein $V_{UL}$ is a voltage corresponding to a condition where substantially all of the lithium ions stored in the intercalation sites have been removed or a condition where further removal of lithium ions from the cathode would damage the cathode; the step of charging the battery with a lithium reactivation charging current includes continuing to apply a normal operation charging current for a an extended duration after a cell voltage of the battery reaches $V_{UL}$; the step of charging the battery with a lithium reactivation charging current includes applying a charging current that is sufficient to activate the redox shuttling additive and less than a diffusion limit of the shuttling additive; and the anode includes a current collector, wherein the dead lithium is lithium metal located on a surface of the anode that is electrically isolated from the current collector.

In some examples, aspects of the present disclosure may also include a vehicle of the present disclosure including a lithium metal battery, and any one of the computing devices of the present disclosure described herein, operably connected to the lithium metal battery.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

What is claimed is:

1. A method of charging a lithium metal battery having a normal operation charging voltage upper limit ($V_{UL}$), a redox shuttling additive having an oxidation potential that is greater than $V_{UL}$, and a lithium metal anode having a current collector and dead lithium that is electrically isolated from the current collector, the method comprising:
   charging the lithium metal battery at a lithium reactivation charging voltage, the lithium reactivation charging voltage being greater than $V_{UL}$;
   oxidizing the redox shuttling additive to form a redox shuttling additive cation-radical;
   reacting the cation-radical with the dead lithium to form a neutral redox shuttling additive and a lithium ion; and
   redepositing the lithium ion on the anode.

2. The method of claim 1, wherein the lithium metal battery includes an electrolyte, the method further comprising, determining a diffusion limit of the redox shuttling additive and its cation-radical in the electrolyte, and determining a lithium reactivation charging current according to the diffusion limit.

3. The method of claim 1, further comprising monitoring a voltage of the lithium metal battery and reducing a lithium reactivation charging current in response to the voltage of the lithium metal battery exceeding the lithium reactivation charging voltage.

4. The method of claim 1, further comprising monitoring a temperature of the lithium metal battery and determining a lithium reactivation charging current according to the monitored temperature.

5. The method of claim 4, further comprising increasing or decreasing the lithium reactivation charging current in response to a change in the monitored temperature.

6. The method of claim 1, wherein the lithium metal anode includes a layer of lithium having a thickness, wherein the thickness of the layer of lithium is less than 50 μm when the battery is initially manufactured and prior to an initial charging of the battery.

7. The method of claim 1, further comprising, determining to initiate a lithium reactivation charging process and performing the charging, oxidizing, reacting, and redepositing steps in response to determining to initiate the lithium reactivation charging process.

8. The method of claim 7, wherein the step of determining to initiate a lithium reactivation charging process includes monitoring at least one of a pressure of the lithium metal battery, an impedance of the lithium metal battery, and a number of charge-discharge cycles, and charging at the lithium reactivation charging voltage when one or more of the monitored pressure, impedance, and charge-discharge cycles exceeds a corresponding threshold value.

9. The method of claim 1, wherein the redox shuttling additive is one or more of 2,5-Di-tert-butyl-1,4-bis(2-methoxyethoxy)benzene (DBBB), 2,5-Di-tert-butyl-1,4-bis(methoxy)benzene (DDB), 2,5-Di-tert-butyl-1,4-bis(2,2,2-trifluoroethoxy)benzene (DBDFB), 2,5-Di-tert-butyl-1,4-bis(2,2,3,3-tetrafluoropropyloxy)benzene (DBTFP), 2,5-Di-tert-butyl-1,4-bis(4,4,4,3,2,2-hexafluorobutyloxy)benzene (DBHFB), 2,7-Diacetylthiathrene, 2,7-Dibromthianthrene, 2,7-diisobutanoylthianthrene, 2-acetylthianthrene, 2,5-Difluoro-1,4-dimethoxybenzene (DFDB), 2-(Pentafluorophenyl)-tetrafluoro-1,3,2-benzodioxaborole, Li2B12F12, Tetraethyl-2,5-di-tert-butyl-1,4-phenylene diphosphate (TEDBPDP), 1,4-Bis[bis(1-methylethyl)phosphinyl]-2,5-dimethoxybenzene (BPDB), 1,4-Bis[bis(1-methyl)phosphinyl]-2,5-difluoro-3,6-dimethyoxybenzene (BPDFDB), Pentafluorophenyl-tetrafluorobenzyl-1,2-dioxoborone (PFPTFBDB), Ferrocene and their derivatives, phenothiazine derivatives, N,N-dialkyl-dihydrophenazine, 2,2,6,6-tetramethylpiperinyloxide (TEMPO), Li2B12H12-xFx (x=9 and 12).

10. The method of claim 1, wherein the lithium metal battery includes a cathode having intercalation sites that receive lithium ions during discharge of the battery, further wherein $V_{UL}$ is a voltage corresponding to a condition where substantially all of the lithium ions stored in the intercalation sites have been removed or a condition where further removal of lithium ions from the cathode would damage the cathode.

11. The method of claim 1, wherein the lithium reactivation charging voltage is less than a voltage safety limit, wherein unwanted chemical reactions begin to occur above the voltage safety limit.

12. The method of claim 11, wherein the lithium metal battery includes an electrolyte and a cathode, wherein the unwanted chemical reactions include at least one of oxidation of the electrolyte and decomposition of the cathode resulting in the production of one or more gases.

13. A method of charging a lithium metal battery having a cathode and a redox shuttling additive, the method comprising:
   determining a likelihood of dead lithium on an anode of the lithium metal battery; and
   initiating a lithium reactivation charging process in response to the determined likelihood being greater than a threshold value;
   wherein the lithium reactivation charging process includes charging the battery with a lithium reactivation charging current, the lithium reactivation charging current designed and configured to increase a potential of the cathode above a normal operation charging voltage upper limit ($V_{UL}$) to oxidize the redox shuttling additive and reactivate the dead lithium with the oxidized redox shuttling additive.

14. The method of claim 13, wherein the step of determining a likelihood of dead lithium includes monitoring at least one of a pressure of the lithium metal battery, an impedance of the lithium metal battery, and a number of charge-discharge cycles, and charging the battery with the lithium reactivation charging current when one or more of the monitored pressure, impedance, and charge-discharge cycles exceeds a corresponding threshold value.

15. The method of claim 13, wherein the lithium metal battery includes a cathode having intercalation sites that receive lithium ions during discharge of the battery, further wherein $V_{UL}$ is a voltage corresponding to a condition where substantially all of the lithium ions stored at the intercalation sites have been removed or a condition where further removal of lithium ions from the cathode would damage the cathode.

16. The method of claim 13, wherein the redox shuttling additive is one or more of 2,5-Di-tert-butyl-1,4-bis(2-methoxyethoxy)benzene (DBBB), 2,5-Di-tert-butyl-1,4-bis(methoxy)benzene (DDB), 2,5-Di-tert-butyl-1,4-bis(2,2,2-trifluoroethoxy)benzene (DBDFB), 2,5-Di-tert-butyl-1,4-bis(2,2,3,3-tetrafluoropropyloxy)benzene (DBTFP), 2,5-Di-tert-butyl-1,4-bis(4,4,4,3,2,2-hexafluorobutyloxy)benzene (DBHFB), 2,7-Diacetylthiathrene, 2,7-Dibromthianthrene, 2,7-diisobutanoylthianthrene, 2-acetylthianthrene, 2,5-Difluoro-1,4-dimethoxybenzene (DFDB), 2-(Pentafluorophenyl)-tetrafluoro-1,3,2-benzodioxaborole, Li2B12F12, Tetraethyl-2,5-di-tert-butyl-1,4-phenylene diphosphate (TEDBPDP), 1,4-Bis[bis(1-methylethyl)phosphinyl]-2,5-dimethoxylbenzene (BPDB), 1,4-Bis[bis(1-methyl)phosphinyl]-2,5-difluoro-3,6-dimethyoxylbenzene (BPDFDB), Pentafluorophenyl-tetrafluorobenzyl-1,2-dioxoborone (PFPTFBDB), Ferrocene and their derivatives, phenothiazine derivatives, N,N-dialkyl-dihydrophenazine, 2,2,6,6-tetramethylpiperinyloxide (TEMPO), Li2B12H12-xFx (x=9 and 12).

17. The method of claim 13, wherein the lithium metal battery includes an anode having a layer of lithium metal having a thickness, wherein the thickness of the layer of lithium is less than 50 μm when the battery is initially manufactured and prior to an initial charging of the battery.

18. The method of claim 13, wherein the lithium metal battery includes an anode having a current collector, wherein the dead lithium is lithium metal located on a surface of the anode that is electrically isolated from the current collector.

19. A method of charging a lithium metal battery having a lithium metal anode, a redox shuttling additive and dead lithium on the anode, the method comprising:
intentionally overcharging the battery to activate the redox shuttling additive and form shuttling additive cation radicals for chemically reacting with the dead lithium to release lithium ions from the dead lithium.

20. The method of claim 19, wherein the step of intentionally overcharging the battery includes charging the lithium metal battery at a lithium reactivation charging voltage, the lithium reactivation charging voltage being greater than a normal operation charging voltage upper limit ($V_{UL}$).

21. The method of claim 20, wherein the redox shuttling additive has an oxidation potential that is greater than $V_{UL}$.

22. The method of claim 19, wherein the step of intentionally overcharging the battery includes charging the battery with a lithium reactivation charging current, the lithium reactivation charging current designed and configured to increase a potential of a cathode of the battery above a normal operation charging voltage upper limit ($V_{UL}$) to oxidize the redox shuttling additive.

23. The method of claim 22, wherein the lithium metal battery includes a cathode having intercalation sites that receive lithium ions during discharge of the battery, further wherein $V_{UL}$ is a voltage corresponding to a condition where substantially all of the lithium ions stored in the intercalation sites have been removed or a condition where further removal of lithium ions from the cathode would damage the cathode.

24. The method of claim 22, wherein the step of charging the battery with a lithium reactivation charging current includes continuing to apply a normal operation charging current for a an extended duration after a cell voltage of the battery reaches $V_{UL}$.

25. The method of claim 22, wherein the step of charging the battery with a lithium reactivation charging current includes applying a charging current that is sufficient to activate the redox shuttling additive and less than a diffusion limit of the shuttling additive.

26. The method of claim 19, wherein the anode includes a current collector, wherein the dead lithium is lithium metal located on a surface of the anode that is electrically isolated from the current collector.

\* \* \* \* \*